July 23, 1963

C. E. CARLO

COILABLE PARTITION

Re. 25,422

Original Filed Dec. 29, 1958

2 Sheets-Sheet 1

INVENTOR
C. E. CARLO

BY Myatt & Dowell
ATTORNEY

July 23, 1963 C. E. CARLO Re. 25,422

COILABLE PARTITION

Original Filed Dec. 29, 1958 2 Sheets-Sheet 2

INVENTOR
C. E. CARLO

BY A. Yates Dowell
ATTORNEY

United States Patent Office

Re. 25,422

Reissued July 23, 1963

25,422

COILABLE PARTITION

Clarence E. Carlo, Dubuque, Iowa, assignor to Dubuque Products, Inc., Dubuque, Iowa, a corporation of Iowa Original No. 2,978,019, dated Apr. 4, 1961, Ser. No. 783,295, Dec. 29, 1958. Application for reissue Jan. 8, 1963, Ser. No. 250,194

5 Claims. (Cl. 160—23)

Matter enclosed in heavy brackets [ ] appears in the original patent but forms no part of this reissue specification; matter printed in italics indicates the additions made by reissue.

This invention relates to building construction subdivided into rooms or compartments and including the arrangement of the walls to provide such rooms or compartments and of a desired size for the necessary accommodations.

The invention is particularly concerned with buildings constructed so that the walls or partitions may be modified to provide areas of different sizes in a minimum of time and with a minimum of effort and in which the original space can be restored after a particular use.

Buildings have been provided with movable walls, however, these walls have been heavy and unwieldy, did not provide a solid barrier, were unsightly and expensive, and among other things required too much time and effort to use.

It is an object of the invention to overcome the difficulties enumerated and to provide a wall or partition which can be readily removed or installed, with minimum effort and consumption of time, and with such walls capable of production at relatively small cost.

Another object of the invention is to provide a structure of the kind indicated in which when the wall or partition when not in use may be contained in a relatively small space but from which it can be readily withdrawn and later quickly redrawn into such area as well as a structure in which the operation may be controlled by a simple electric switch.

Figure 1:
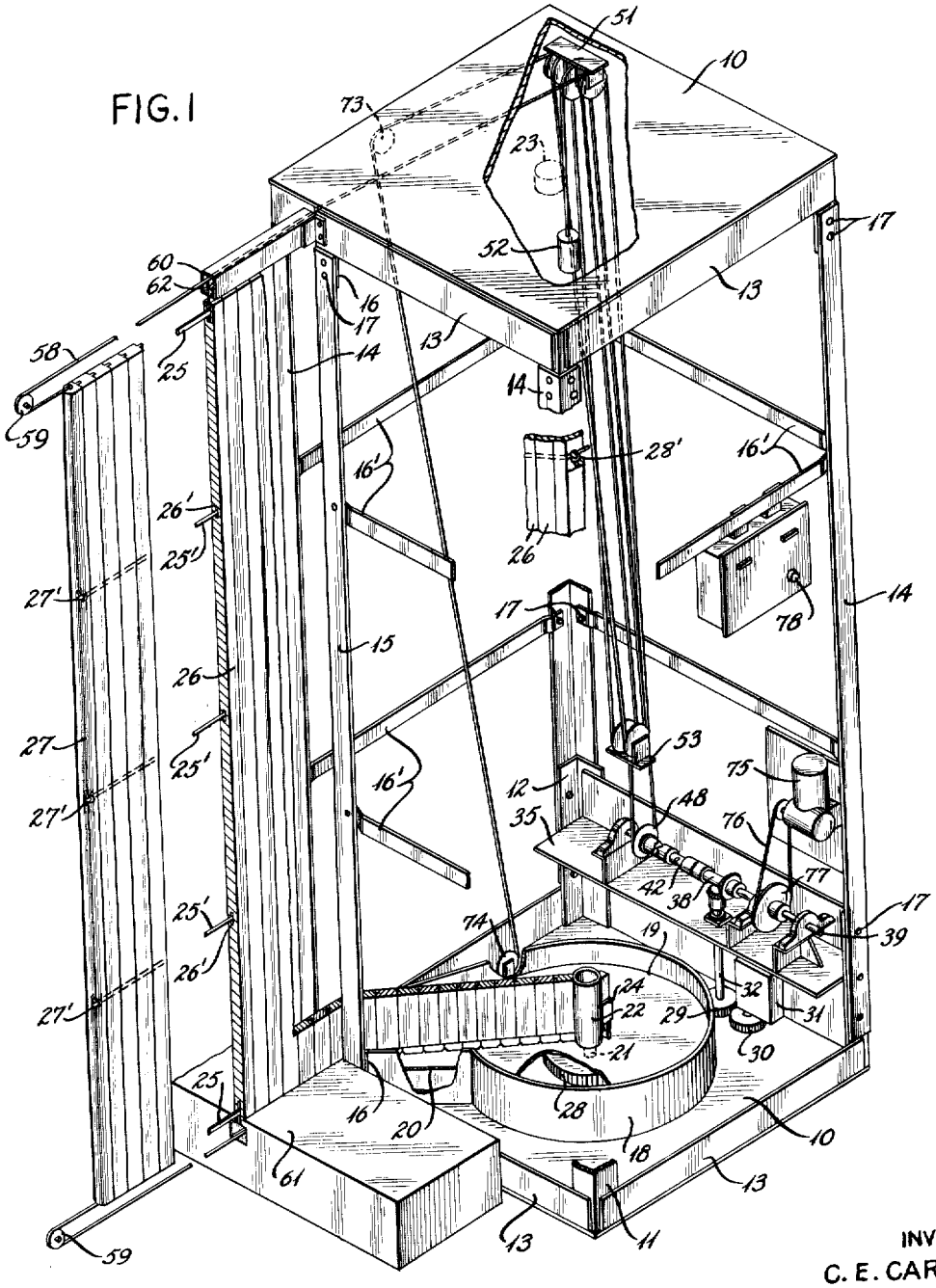
Figure 2:
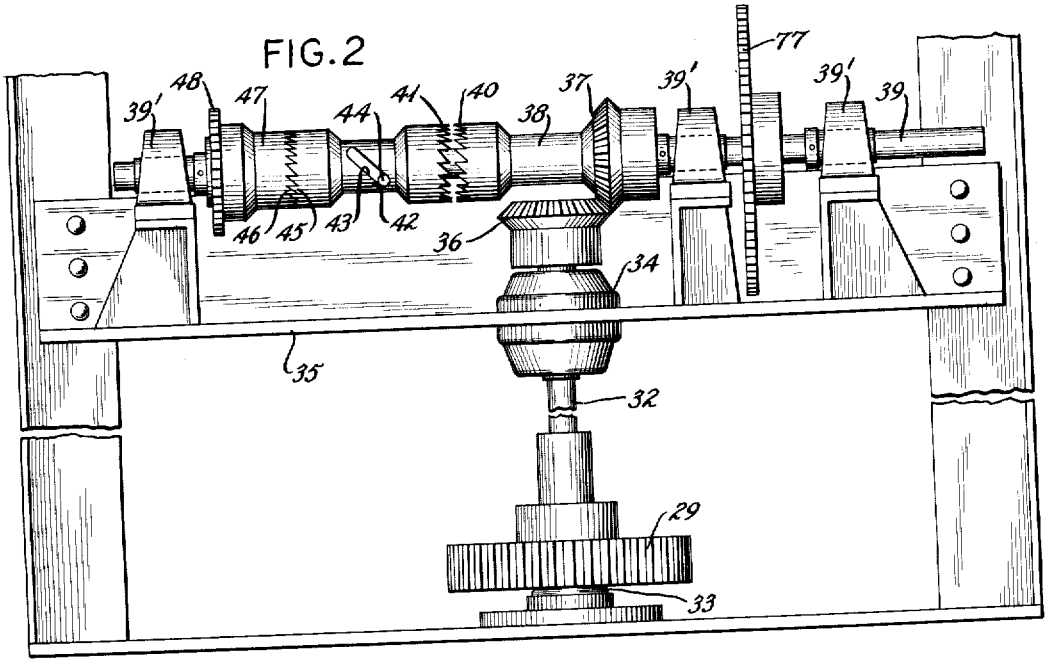
Figure 3:
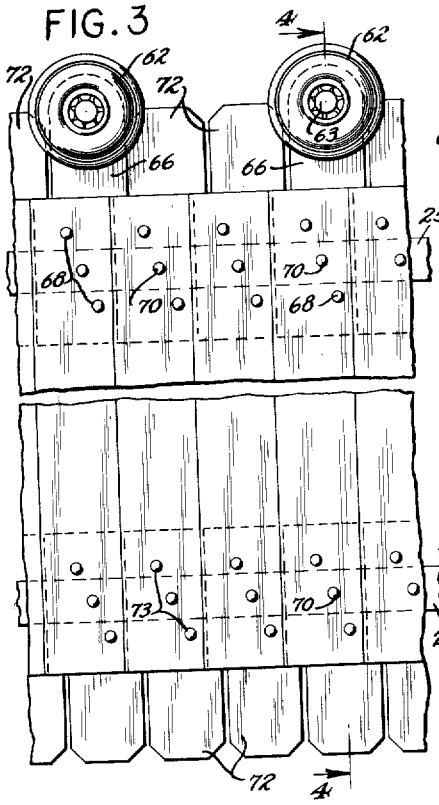
Figure 4:
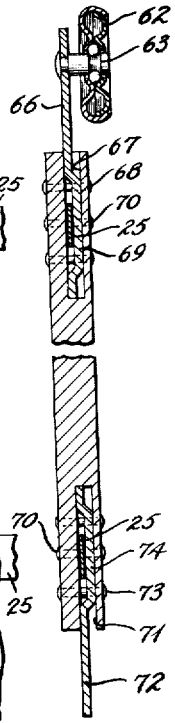
Figure 5:
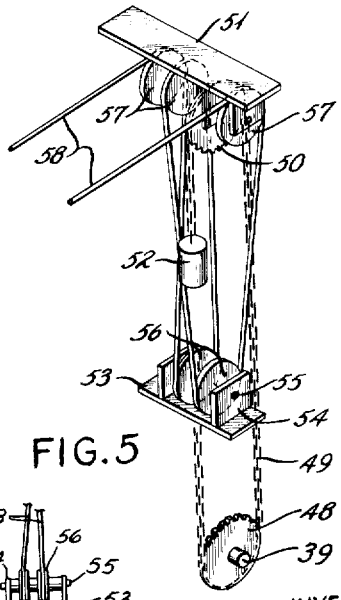
Figure 6:
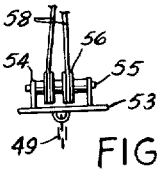

Other objects and advantages of the invention will be apparent from the following description taken in conjunction with the accompanying drawings wherein:

FIG. 1 is a perspective illustrating one application of the invention part of a top plate being broken away to expose hidden portions, other parts being shown in section;

FIG. 2, an enlarged horizontal section;

FIG. 3, an enlarged fragmentary section of a portion of the partition;

FIG. 4, a similar view at right angles to FIG. 3;

FIG. 5, a fragmentary detail illustrating the block and tackle structure of FIG. 1; and FIG. 6, a side elevation of a plate and adjacent parts forming part of FIG. 5.

Briefly stated, the invention is a coilable partition composed of a series of vertically disposed slats having tongue and groove or other interfitting portions so that they can be wound around a pole or post, such slats being suspended by hangers carrying rollers located in a guide at the top with brackets depending from the lower ends of the slats into a corresponding guide in the floor, tapes being attached to the outermost slat and extending through slots in the ends of the slats with such tapes connected to the center pole or post and guided by means of circular end guides, a turntable being located within the lower end guide to form a support for the coiled partition, the upper and lower guides for the partition being mounted in a coil box or holder and a motor being provided for rotating the center post through a train of gears and for applying force to a cable attached to the outer end of the partition for uncoiling the latter, the motor being reversible and safety mechanism being provided for interrupting the motor after the partition has been coiled upon itself.

With continued reference to the drawings a coil box or holder for the coilable partition is provided, such coil box comprising top and bottom plates 10 attached to corner angles 11 and 12 and with side strips 13, four corner angles 11 being used at the top and two such angles being used at the bottom in conjunction with two taller corner angles 12 at the corners of the bottom plate 10.

The angles attached to the top and bottom plates are connected by corner posts 14 so that the top and bottom plates 10 are maintained in fixed spaced relation. An additional upright angle post 15 is mounted in slightly spaced relation to one of the corner posts 14 so that an opening is provided for the passage of a coilable partition, the post 15 being attached to a bracket 16 secured to the adjacent strips 13. If desired struts, braces, or other strengthening members 16' may be provided. The parts previously described may be fastened together in any desired manner, as, for example, by welding or by fasteners such as bolts 17 or the like.

Attached to the bottom plate 10 is a circular guide 18 having ends converging near the contiguous posts 14 and 15 between which the partition can move in its passage to and from the coil box.

Within the guide 18 is mounted a plate forming a turntable 19, the upper surface of which is located intermediate the parallel upper and lower edges of guide 18, and in order to provide a continuous supporting surface a plate forming a ramp 20 is disposed between the end portions of the guide 18 thus supplementing the surface of the turntable in order that the partition may have a continuous floor or surface on which to travel.

The turntable 19 is rotatably mounted on a shaft 21 on the lower end of a vertical center post 22 about which a partition is adapted to be coiled and uncoiled, and the upper end of which is journaled in a bearing 23 attached to the upper plate 10. An apertured attaching clip 24 is fastened to the center post 22 adjacent the upper and lower ends thereof and to these clips are attached tapes 25 at the top and bottom, and to which are attached partition-forming strips or slats 26 preferably having loose fitting tongue and groove edges to overlap and provide a solid partition or closure.

The tapes 25 have their outer ends remote from the center post 22 fastened to an end or terminal partition member 27, and means is provided for rotating the turntable 19 and the center post 22 for coiling the partition onto the center post and for pulling the end or terminal member 27 of the partition in the opposite direction for uncoiling such partition, or in other words for moving the partition from coiled to uncoiled or extended position.

In order to maintain the tongue and groove joints of the slats in alignment, a series of prestressed cables 25' are provided at spaced intervals between the tapes 25. The cables 25' are threaded through openings 26' in the slats and one end of the cables is secured to the terminal strip 27 as shown at 27' and the opposite end of the cables is secured to the center post 22 through the intermediary of the terminal member 27 which is secured in the clips 24, the securement of the cables being indicated at 28'.

The operations of coiling and uncoiling are electrically accomplished and for this purpose on the bottom of the shaft 21 is attached a gear 28 forming a part of a train terminating in gear 29 which engages a gear 30 operating an automatic cutoff or safety switch 31. A suitable type of switch is shown in the patent to C. H. Moores 945,472 issued January 4, 1910. The gear 29 is fixed to a shaft 32 (FIG. 2) mounted in a thrust bearing 33 and extending upwardly through bearings 34, one on each side of an angle plate or shelf 35 fastened to the angles 12.

On the upper end of the shaft 32 is a bevelled gear 36 which engages a similar bevelled gear 37 mounted on one end of a sleeve 38 which is freely rotatable on horizontal shaft 39 mounted on spaced pillow blocks or bearings 39' fixed on the shelf. The end of the sleeve 38 opposite the gear 37 has a notched end forming a clutch face 40 for engagement with a couplementary clutch face 41 on one end of a slidable and rotatable sleeve 42 having an angular slot 43 in which is received a pin 44 fixed to the shaft 39 to limit the amount of slide and rotation of the sleeve 42 as well as to provide means for driving such sleeve. The sleeve 42 has its end opposite the clutch face 41 provided with a second clutch face 45 for engagement with the complementary clutch face 46 on a sleeve 47 which is freely rotatable on the shaft 39 [,].

*A partition extending mechanism is connected to the sleeve 47 for operation by such sleeve when the clutch face 46 engages the clutch face 45. As illustrated the sleeve has* [such sleeve having] a sprocket 48 which engages and drives a chain 49 (FIG. 5) extending over a sprocket 50 suspended from a head plate or bracket 51 fastened to the top plate 10 by welding or the like. The end of such chain is provided with a counterbalance 52 and its opposite end is attached to a floating plate or block 53 having spaced brackets 54, in between which are mounted a shaft 55 on which are carried a pair of pulleys or sheaves 56, the head plate 51 also having attached thereto a series of sheaves 57 freely rotatably mounted, side by side.

A cable 58 has one end attached to the end partition member 27 and is extended around an upper pulley 59 and through a passage formed by an upper channel member 60 adapted to be attached to or recessed in the ceiling (not shown). The upper channel member 60 is adapted to receive a roller 62 (FIG. 4) carried on a shaft forming rivet 63.

The rivet 63 is mounted in the upper end of a bracket 66 extending into slots 67 in the upper ends of the slats 26 and secured therein by rivets 68, the bracket having an offset portion 69 in which is received the tape 25 and secured to the slats by rivets 70. At their lower ends, the slats or partition members each are provided with a slot 71 in which are received brackets 72 held therein by rivets 73, such brackets having offset portions 74 to accommodate a lower tape 25 held by a rivet 70. The brackets 66 are located on the top of the first and fourth slats from one end to the other and, if desired, brackets 72 may be applied to the intermediate slats in the same manner, while at the bottom a number of the brackets 72 are provided, preferably one on each panel and offset from the panel (FIG. 3) so that one bracket rests on the offset portion of an adjoining bracket.

The cable 58 attached to the upper end of the outermost panel member 27 extends around pulley 59 and into the coil box, around each of the upper and lower pulleys 57 and 56 from right to left in FIGS. 1 and 5, and then out over upper pulley 73 and downwardly beneath lower pulley 74 and outwardly over lower pulley 59 and is attached to the lower end of the outermost or terminal partition member 27. In passing from the last left-hand lower pulley 56 to the left-hand upper pulley 57, the cable is passed in a reverse direction over the upper pulley.

An electric reversible motor 75 supplies power, such motor driving a chain 76 and a larger sprocket 77 fixed to the shaft 39. An electric circuit reversing switch 78 is provided for controlling the direction of motor operation. When the switch 78 is in one position the clutch faces 40, 41 will be in engagement causing *the bevel gear 37 to drive the gear 36, which in turn drives the gear 29, and the gear train meshing therewith to coil the partition about the post 22* [the coiling of the partition] until the cutoff switch 31 is actuated by the gear 30. When the switch is reversed the clutch faces 40 and 41 will be disengaged and the clutch faces 45 and 46 will be engaged causing rotation of the *partition extending mechanism including the* sprocket 48 to pull the chain 49 and plate 53 downwardly lengthening the extent of the cable about the pulleys 56 and 57 to cause extension or uncoiling of the partition. A simple practical partition and mechanism for coiling and uncoiling the same is thus provided.

It will be apparent that a hand crank may be provided in lieu of the electric motor 75 and the direction of travel of the partition will be governed by the direction of rotation of the hand crank. When a hand crank is utilized, the motor 75, chain 76, sprocket 77, reversing switch 78 and cutoff or limit switch 31 and its associated gearing may be eliminated.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A coilable partition and operating means therefor comprising a coil box, a post lengthwise in said box, a series of slats having interfitting edges and providing a coilable partition, flexible members connecting said slats, one end of said coilable partition being connected to said post so that when said post is rotated the partition will be coiled about the same, said operating means comprising a gear train connected to said post, said gear train being driven by a shaft and a bevelled gear, a drive shaft mounted on said box substantially perpendicular to said gear train shaft, a freely rotatable sleeve mounted about said drive shaft, a clutch plate mounted on one end of said sleeve, a second bevelled gear attached to the opposite end of said sleeve and in engagement with said first mentioned gear, an electric motor means for driving said drive shaft in opposite directions, a slidable clutch mounted about said shaft and having an angular slot therein, a pin operable within said slot connecting said shaft to said clutch whereby when the shaft is rotated in one direction the clutch will be forced into engagement with the bevelled gear sleeve and when the shaft is rotated in the opposite direction the clutch will be disengaged from such sleeve, a sprocket carried by a freely rotatable sleeve and mounted about said drive shaft adjacent to the end of the clutch opposite the bevelled gear sleeve, a clutch plate on the end of said sprocket sleeve adjacent said clutch, a pair of blocks one of which is fixed to the upper portion of the coil box and the other of which is free for vertical movement in the box, a chain connecting the second of said blocks to said freely rotatable sprocket, a cable having one end connected to the upper free end of said partition and the opposite end connected to the lower free end thereof, said cable extending around said pair of blocks so that when said motor is operated in said reverse direction the clutch will engage the clutch plate of said sprocket sleeve to operate said chain and move the block attached thereto towards said sprocket and cause the partition to be extended.

2. A coilable partition and operating means therefor comprising a coil box, a post lengthwise in said box, a series of slats connected by flexible members and providing a coilable partition, one end of said partition being connected to said post, said operating means comprising gearing adapted to drive said post, said gearing being selectively driven by a drive shaft mounted on said box, a reversible motor adapted to drive said drive shaft, a first freely rotatable means connecting said gearing and said drive shaft, a clutch plate on said first freely rotatable means, a second freely rotatable means mounted about said drive shaft in spaced relation to said first freely rotatable means, a clutch plate on said second freely rotatable means, a sprocket on said second freely rotatable means, a slideable clutch mounted on said drive shaft intermediate said first freely rotatable means and said second freely rotatable means and adapted to engage one or the other of said means depending upon the direction of rotation of said drive shaft, a fixed block and a movable block, a chain connecting said movable block to said sprocket, a cable having one end connected to the upper free end of said partition and the opposite end connected to the lower free end thereof, said cable extending around said fixed and movable blocks whereby when the drive shaft is rotated in one direction the clutch will engage the first freely rotatable means and drive the gearing and the post and when the drive shaft is rotated in the opposite direction the clutch will engage the second freely rotatable means to operate said chain and move said movable block toward said sprocket and cause the partition to be extended.

3. A coilable partition and operating means therefor comprising a coil box, a post in said box, a coilable partition, one end of said partition being connected to said post, said operating means comprising gearing adapted to drive said post, said gearing being selectively driven by a drive shaft mounted on said box, power means adapted to drive said drive shaft, a first freely rotatable means connecting said gearing and said drive shaft, a clutch member on said first freely rotatable means, a second freely rotatable means mounted about said drive shaft in spaced relation to said first freely rotatable means, a clutch member on said second freely rotatable means, a sprocket on said second freely rotatable means, a slidable clutch mounted on said drive shaft intermediate said first freely rotatable means and said second freely rotatable means and adapted to engage one or the other of said means depending upon the direction of rotation of said drive shaft, a fixed block and a movable block, a chain connecting said movable block to said sprocket, flexible means connected to the free end of said partition and extending around said fixed and movable blocks whereby when the drive shaft is rotated in one direction the clutch will engage the first freely rotatable means and drive the gearing and the post and when the drive shaft is rotated in the opposite direction the clutch will engage the second freely rotatable means to operate said flexible means and move said movable block toward said sprocket and cause the partition to be extended.

4. A coilable partition and operating means therefor comprising a holder, a coilable partition rotatably mounted in said holder, said operating means comprising a drive shaft, power means adapted to drive said drive shaft in either direction, driving means for coiling said partition, a first freely rotatable means mounted about said drive shaft and connected to said driving means, a clutch member on said first freely rotatable means, a second freely rotatable means mounted about said drive shaft in spaced relation to said first freely rotatable means, a clutch member on said second freely rotatable means, a sprocket on said second freely rotatable means, a slidable clutch mounted on said drive shaft intermediate said first clutch member and said second clutch member and adapted to engage one or the other of said members depending upon the direction of rotation of said drive shaft, a fixed block and a movable block, a chain connecting said movable block to said sprocket, cable means connected to the free end of said partition and extending around said fixed and movable blocks whereby when the drive shaft is rotated in one direction the clutch will engage the first freely rotatable means and operate the drive means to coil the partition and when the drive shaft is rotated in the opposite direction the clutch will engage the second freely rotatable means to operate said chain and move said movable block toward said sprocket and cause the partition to be extended.

*5. A coilable partition and operating means therefor comprising a holder, a coilable partition rotatably mounted in said holder, said operating means comprising a drive shaft, power means adapted to drive said drive shaft in either direction, driving means for coiling said partition, a first freely rotatable means mounted about said drive shaft and connected to said driving means, a clutch member on said first freely rotatable means, a second freely rotatable means mounted about said drive shaft in spaced relation to said first freely rotatable means, a clutch member on said second freely rotatable means, partition extending means connected to said second freely rotatable means, a slidable clutch mounted on said drive shaft intermediate said first clutch member and said second clutch member for selective engagement with one or the other of said members depending upon the direction of rotation of said drive shaft whereby when the drive shaft is rotated in one direction the clutch will engage said first freely rotatable means and operate the driving means to coil the partition and when the drive shaft is rotated in the opposite direction the clutch will engage the second freely rotatable means to operate said partition extending means and cause the partition to be extended.*

References Cited in the file of this patent or the original patent

UNITED STATES PATENTS

| | | |
|---|---|---|
| 1,147,188 | Rojas | July 20, 1915 |
| 1,295,712 | Drew | Feb. 25, 1919 |
| 1,621,717 | Grant et al. | Mar. 22, 1927 |
| 2,012,437 | Segal | Aug. 27, 1935 |
| 2,934,134 | Wardlaw | Apr. 26, 1960 |